Oct. 15, 1963  G. J. H. KAHLERT  3,106,912
AIR COOLED ROTARY INTERNAL COMBUSTION ENGINE
Filed March 17, 1961  5 Sheets-Sheet 2

FIG. 2.

FIG. 12.
COMMON CYCLOID

FIG. 13.
CURTATE CYCLOID

FIG. 14.
PROLATE CYCLOID

INVENTOR.
GEORGE J. H. KAHLERT,
BY
McMorrow, Berman & Davidson
ATTORNEYS.

United States Patent Office 3,106,912
Patented Oct. 15, 1963

3,106,912
AIR COOLED ROTARY INTERNAL
COMBUSTION ENGINE
George J. H. Kahlert, R.R. 3, Salmon Arm,
British Columbia, Canada
Filed Mar. 17, 1961, Ser. No. 96,477
16 Claims. (Cl. 123—12)

This invention relates to internal combustion engines, and more particularly to an improved rotary internal combustion engine of the gear or double rotor type.

A main object of the invention is to provide a novel and improved internal combustion engine of the toothed double rotor type, the engine providing a high output capacity for its weight and size, which is economical in fuel consumption, and which develops power in a smooth and efficient manner.

A further object of the invention is to provide an improved internal combustion engine of the gear or double rotor type wherein the cooperating gear teeth provide a high compression ratio for a given number of teeth than has been heretofore obtainable, wherein the rotating parts are securely supported, and wherein improved control gearing is provided for accurately maintaining the cooperating gear teeth in their proper relationship.

A still further object of the invention is to provide an improved air cooled rotary internal combustion engine of the gear or double rotor type which is provided with means for obtaining improved engine breathing, with means for obtaining improved cooling of the engine parts and which provides improved exhaust gas disposal.

A still further object of the invention is to provide an improved rotary internal combustion engine of the gear or double rotor type which is provided with means to efficiently lubricate the bearings and other relatively movable parts thereof, which is provided with means for controlling leakage of the expanding gases so as to efficiently utilize the power developed by the combustion of the fuel, and which employs injection feed of the fuel to the engine.

A still further object of the invention is to provide an improved rotary internal combustion engine of the gear or double rotor type which includes means for smooth and efficient power transmission to its output shaft, wherein vibration and wear are minimized and which utilizes the expansive force of the combustible gases substantially in a manner similar to a reciprocating piston engine.

A still further object of the invention is to provide an improved rotary internal combustion engine of the gear or double rotor type wherein the cooperating gear teeth are efficiently contoured so as to define substantially closed compression chambers during their entire period of coaction and to sealingly provide expansion chambers for the combustion gases so that the expansive force of the gases is efficiently utilized.

Further objects and advantages of the invention will become apparent from the following description and claims, and from the accompanying drawings, wherein:

Referring to the drawings, the engine of the present invention comprises a pair of toothed rotors 1 and 2 with the main teeth of the rotors interengaging in a manner presently to be described, the teeth being specially shaped to define a fluid "entrapment" chamber where the teeth fully interengage, as will be presently described. The two cooperating rotors 1 and 2 rotate on a common shaft 3 which is bent at a central point between the rotors so that the rotors are correspondingly inclined relative to each other. The inclination of the rotors is sufficient so that the rotor teeth are fully interengaged at one portion of the cycle of revolution of the rotors but are completely disengaged at the opposite portion of said cycle, as shown diagrammatically, for example, in FIGURE 9. As will be presently explained, this feature makes it possible to obtain a relatively high compression ratio, for example, a ratio of the order of 30 to 1. Such a ratio is ordinarily too high for practical use, so that it is found to be necessary to provide recesses 22 in the outer surfaces of the rotors which absorb the surplus compression and reduce the compression to a practical value, for example, to a value of 10 to 1. As will be presently explained, the atomized fuel employed in the engine is sprayed into the recesses 22, for example, through a suitable nozzle 25 located adjacent the fully interengaged rotor teeth.

Figures 4, 18:
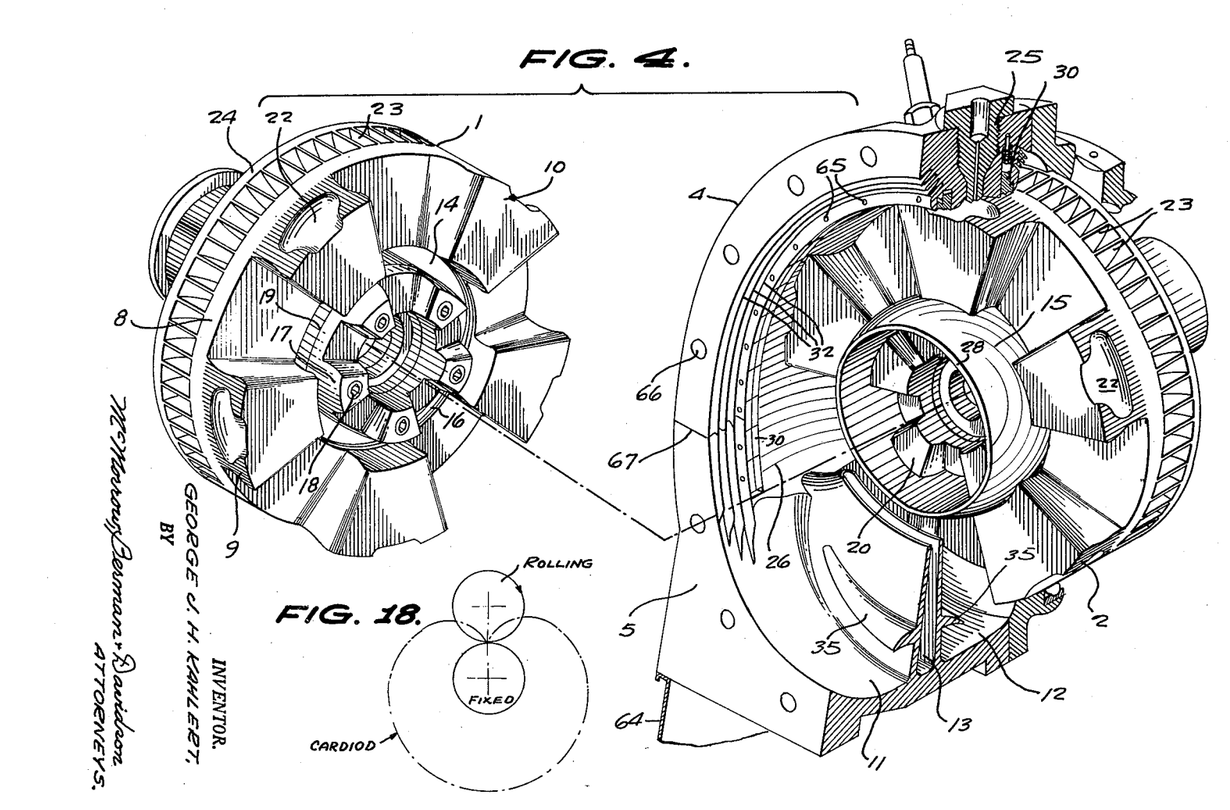
FIGURE 4 is a fragmentary perspective view showing the cooperative rotor elements of the engine of FIGURE 1, said rotor elements being shown in separated positions.

Inasmuch as the present invention does not contemplate lubrication of the rotor teeth, the teeth should not actually touch each other, but should be kept slightly clear of each other. This is accomplished by the provision of control gears 17 and 20 on the respective rotors 1 and 2, the gears being located inside a spherical housing 15 provided on the rotor 2, as shown in FIGURE 4. The control gears 17 and 20 are in close coupling engagement with each other, allowing no backlash, and thus do not permit the main rotor teeth 10 to contact each other.

As will be presently pointed out, the engine of the present invention is so arranged that there are no eccentric parts which would cause a high bearing load, so that the only factors which would limit the maximum of speed of the engine are bearing life, the tensile strength of the rotor under centrifugal forces, and other limitations which would require the speed to be held at or below a critical value.

Figures 1, 9, 10, 11:
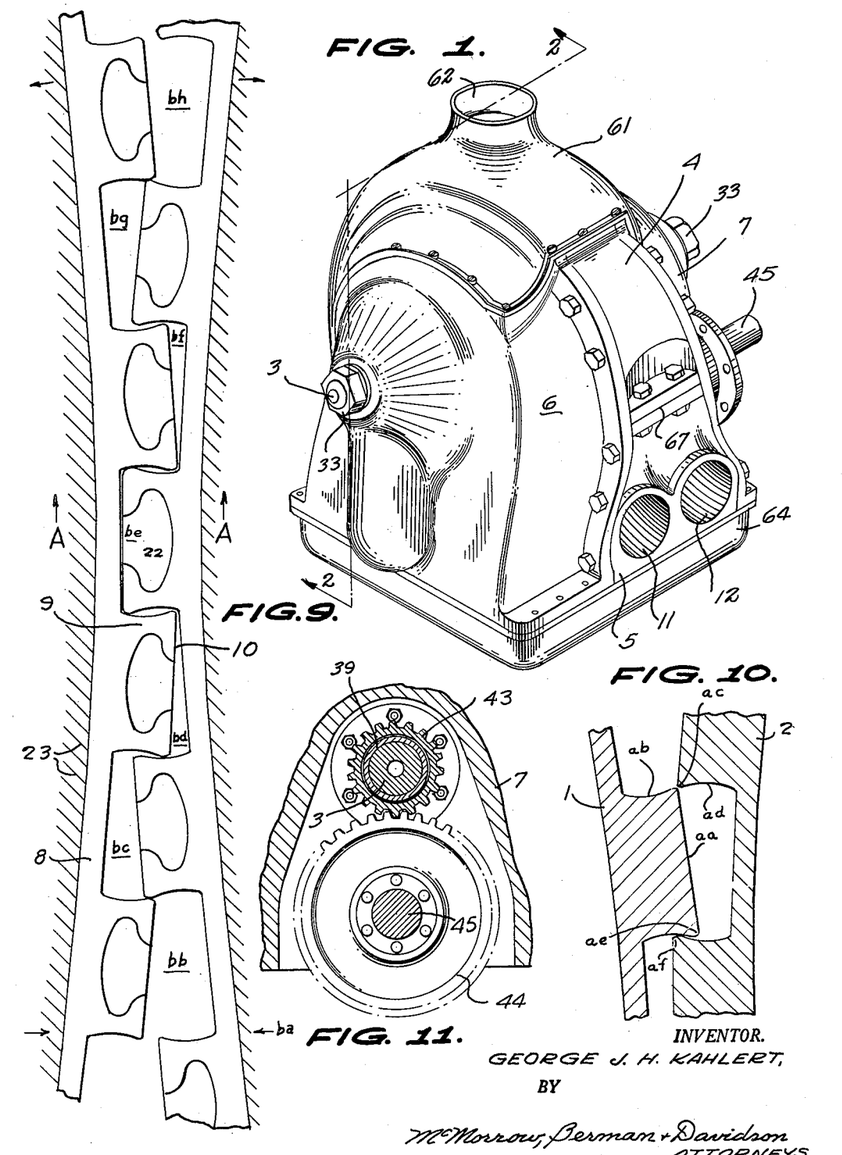
FIGURE 1 is a persective view of an improved rotary internal combustion engine constructed in accordance with the present invention.
FIGURE 9 is a fragmentary top plan view of the cooperating rotors, showing the manner in which their teeth cooperate.
FIGURE 10 is an enlarged cross sectional view taken through cooperating toothed portions of the rotors of the engine and illustrating the manner in which the engaging surfaces of the rotor teeth move relative to each other.
FIGURE 11 is a cross sectional view taken substantially on the line 11—11 of FIGURE 2.
Figures 6, 7, 8, 19:
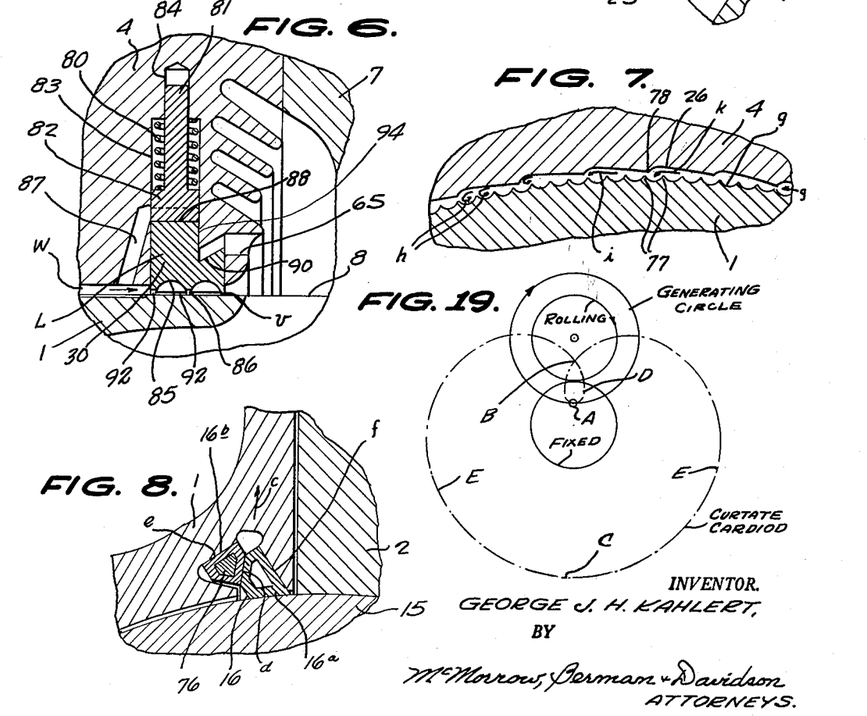
FIGURE 6 is a fragmentary cross-sectional view taken on the line 6—6 of FIGURE 5.
FIGURE 7 is in enlarged fragmentary cross sectional view showing the contours of a portion of one of the rotor members and the adjacent inside wall of the engine housing and illustrating the means for controlling leakage therebetween.
FIGURE 8 is an enlarged fragentary cross sectional view taken through the compression seal assembly employed between one of the rotors and the spherical control gear housing of the engine.

The main teeth 10 of the rotors are suitably formed by machining, or the like, so as to mate with each other in the manner illustrated in FIGURES 9 and 10, and presently to be described in detail. The left rotor 1 is formed with a relatively deep, substantially spherical recess 14 shaped to receive the substantially spherical control gear housing 15 carried by the right rotor 2. A compression seal assembly 16 is mounted in an annular groove formed in the spherical recess 14, the sealing assembly 16 sealingly engaging the surface of the spherical gear housing 15, as shown in FIGURE 8, and to be described in detail subsequently.

The control gear 17 is secured to the main body of rotor 1 by a plurality of bolts 18 and is suitably shimmed at the joining surfaces, shown at 19, to provide no backlash when assembled and in mating engagement with the cooperating control gear 20 on the rotor 2. Ball bearings 21 rotatably support the rotor 1 on the shaft 3, as shown in FIGURE 2, the ball bearing assemblies being of any suitable conventional design.

Designated at 23 are combined air cooling fins and blower impellers which have the main function of cooling the engine. Each rotor is provided with an annular sealing surface 8 located between the main peripheral rotor surfaces 9 and the impeller fins 23. Each rotor is provided with the peripheral annular end ring 24 which serves both as a guiding means for the cooling air and also as a means to minimize rotor deformation due to centrifugal force and thermal expansion.

Figure 2:
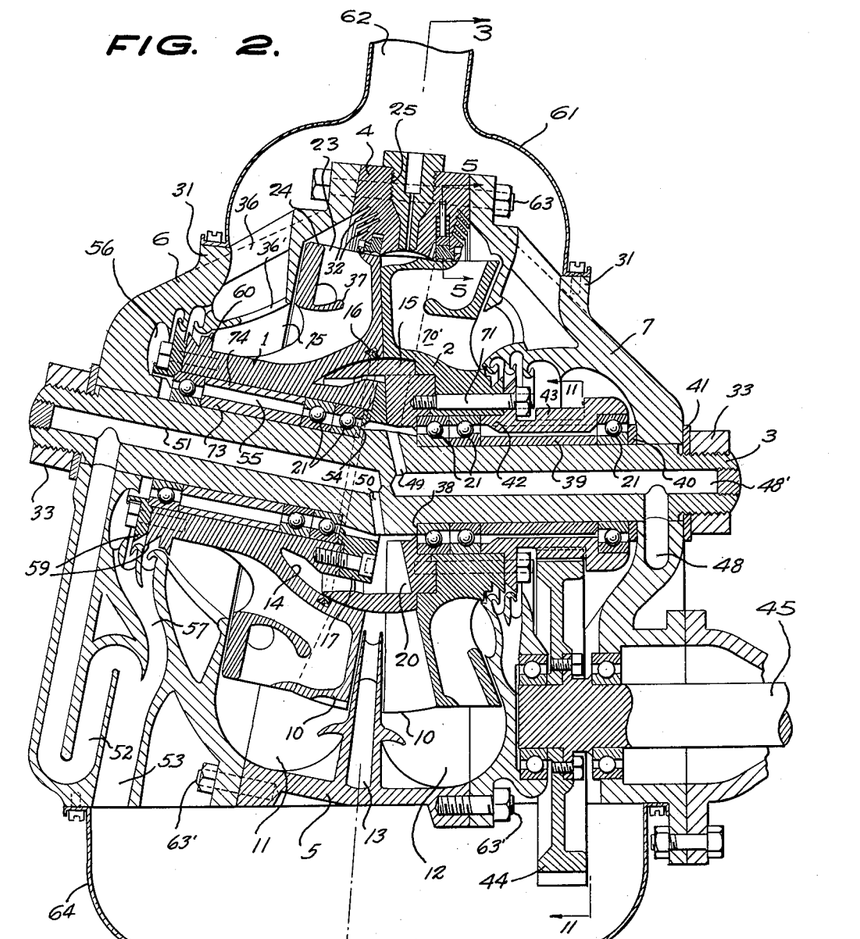
FIGURE 2 is an enlarged vertical cross sectional view taken substantially on the line 2—2 of FIGURE 1.

The engine is provided with a housing which comprises a top segment 4, a bottom segment 5, a right side segment 7 and a left side segment 6, as shown in FIGURE 2. The rotor 2 is the same in construction as the rotor 1 with the exception that it carries the spherical control gear housing 15, said control gear housing being formed at its left rim with the annular oil sealing surface portion 28. Designated at 42 is a sleeve member which is secured to the rotor 2 by means of stud bolts 71, the sleeve member 42 being formed with the pinion gear 43 which meshes with an output gear 44, presently to be described.

The injector nozzle 25 is mounted in the top housing 4, and adjacent thereto is mounted a suitable ignition member, such as a spark plug or glow plug 27. The injector nozzle 25 operates continuously once the engine is started, and after serving to ignite the engine fuel, the spark plug 27 is subsequently not required. Advancing of ignition can be achieved by providing a second injector nozzle, shown at 25′, located between 10 and 20 degrees ahead of the first-described injector nozzle 25, corresponding to between 10 and 20 degrees advancement before the "top dead center" condition of the interengaging main rotor teeth. Designated at 30 is a leakage control seal assembly, shown in detail in FIGURES 5 and 6, and presently to be described. An intake manifold 61 for cooling air is provided, the intake manifold 61 being bolted to flange elements 31 provided on the top engine housing segment. Cooling fins 32 are provided in the housing segments 4 and 5 at the opposite sides of the intermeshing portions of the main rotor teeth.

Designated at 13 is an air intake passage, and designated at 11 and 12 are the air outlet and exhaust passages of the engine.

As shown in FIGURE 2, the mutual inclination of the rotor elements 1 and 2 causes the main rotor teeth thereof to be in substantially meshing engagement at their top portions but to be completely separated at their bottom portions. Referring to FIGURE 9, which may be considered to be a fragmentary representation of the developed peripheral portions of the main rotor teeth 10 let it be assumed that the rotors are rotating in a direction such that the elements shown in FIGURE 9 move upwardly, namely in the direction of the arrows A, A. Under these conditions, the lower portions of the elements shown in FIGURE 9 are moving inwardly towards each other, namely, in the direction of the arrows b, a. Therefore, scavenging has been completed in the space b, b, and compressions are in progress in the spaces bc and bd. Fuel injection and combustion occurs at the space be, and at the spaces bf and bg, combustion is in progress. At the space bh exhaust scavenging has started. This exhaust scavenging is accomplished by the centrifugal blower action of the main rotor teeth 10. Since the intake port 13 is located closer to the center of the engine than the exhaust passages 11 and 12, the centrifugal action of the revolving rotors will push out the burnt gases and replace them with fresh air from the intake port 13. If so desired, this action may be supplemented by employing a supercharger. The burnt gases combine with the cooling air in the passages 11 and 12 and are exhausted therefrom as shown in FIGURE 1. Stationary mixing flanges or vanes 35 are provided in the passages 11 and 12 to mix the exhaust and cooling air and thereby reduce heating of the engine housing.

As shown in FIGURE 4, the engine housing segments are formed with suitable apertures 66 to receive the housing fastening bolts 63 and the stud bolts 63′ shown in FIGURE 2. The top and bottom housing segments engage each other at a joining plane 67, as shown in FIGURE 4.

As is further shown in FIGURE 4, the control seal assemblies are provided with suitable balance holes 65.

As shown in FIGURE 2, the main shaft 3 is rigidly secured at its right side portion by means of a clamping nut 33 threadedly engaged on the end of the main shaft 3 and exerting clamping force on the housing segment 7 through a washer 41. The clamping force of the nut 33 is transmitted through the shaft to an annular abutment shoulder 38 formed thereon which is in turn transmitted through the inner races of the associated ball bearing assemblies 21, as intervening spacer sleeve 39 and a washer 40. In this manner, the right side portion of the shaft 3 is rigidly secured, and if so desired, the shaft and bearings may be preloaded by suitably tightening the nut 33. The left side of the shaft 3 is rigidly secured to the engine housing segment 6 in the same manner. The entire construction including the housing segments and the shaft 3 is thus completely rigid.

The sleeve member 42, secured to the right rotor member 2 constitutes a pinion gear carrier provided with the pinion teeth 43 which mesh with the output gear 44. The gear 44 transmits power to the output shaft 45, which operates an oil pump, not shown, and other accessories for the engine, besides transmitting useful energy to devices driven by the engine. The oil pump furnishes oil under pressure through a passage 48 which flows through an axial bore 48′ provided in the right side section of shaft 3 and passes therefrom to the interior of the control gear housing 15 through a passage 49. Most of the oil, after lubricating and cooling the control gear housing and its components, escapes through an aperture 50 into an axial bore 51 provided in the left side section of shaft 3, and passes therefrom to a cooling chamber 52 and flows therefrom through a passage 53 into the oil reservoir 64. The lubricating oil is supplied through restricted passages 54 to the adjacent bearing assemblies 21, and by centrifugal force moves outwardly to form thin films on the outside races of said bearings, passing through a space 55 defined between respective inner and outer spacer sleeves 73 and 74 surrounding the left portion of shaft 3 and clamped between the adjacent bearing assemblies 21. The oil passes through space 55 to a chamber 56 and drains downwardly through a passage 57 to the oil return passage 58. Leakage of the oil to the cooling air chamber, shown at 75, is prevented by the provision of a pair of oil slingers 59, 59 on the end of rotor member 1 and a labyrinth-defining flange 60 provided on the rotor member 1 inwardly adjacent the slingers 59, 59.

The cooling air enters shroud 61 through its top opening 62 and enters the engine through openings 36 and 36′, leading to the space 75. The air then passes over the rotor cooling fins 23, being guided thereto by projections 37 and the annular ring 24. After leaving the rotor, the air passes over the cooling fins 32 in the upper portion of the engine housing, mixes with the exhaust gases in the chambers 11 and 12, and escapes through the exhaust duct.

FIGURE 8 shows an enlarged sectional view of the annular compressional seal assembly 16 provided in the left rotor 1. The sealing assembly 16 comprises two parts, namely a sealing ring 16a and a balancing ring 16b. The sealing assembly 16 has the function of preventing the combustion gases from entering the space between the gear housing 15 and the rotor 1. The purpose of the special construction of the sealing assembly 16 is to keep the sealing ring 16a in contact with control gear housing 15 when rotors 1 and 2 are revolving and are exerting a centrifugal force on all rotating parts, including the parts of the seal assembly 16. The direction of the centrifugal force is shown by the arrow c in FIGURE 8. The sealing ring 16a is lighter than the balancing ring 16b, being hollow in the specific structure illustrated in FIGURE 8. The balancing ring 16b is heavier than the sealing ring element 16a, and may be provided with a heavy core 76 of lead or other heavy material. When rotating, the two rings 16a and 16b slide outwardly along faces e and f until they contact each other on face d. Then, because the balancing ring 16b is heavier, the sealing ring 16a is forced inwardly by its wedging cooperation with ring 16b until the inner ring 16a engages the surface of the housing member 15 with sealing contact.

Both rings 16a and 16b are cut through at some point in their circumference in the manner of a piston ring in a reciprocating piston engine. The sealing ring 16a is tensioned to become smaller than its working diameter when released, and the balancing ring 16b is tensioned to become larger when released. This construction keeps the rings in their proper relative positions when the rotors are not turning.

Referring to FIGURES 7 and 4, 26 designates the inner surface of top engine housing segment 4, and 9 designates the outer surface of the adjacent rotor member, which may be either the rotor member 1 or the rotor member 2. Thus, the adjacent surface 9 of the rotor member is formed with the evenly spaced serrations 77 and the surface 26 is formed with serrations 78 which are relatively elongated at one side and which are much longer than the serrations 77, as shown. The purpose of the special surface configurations shown in FIGURE 7 is to slow down and control the flow of gases in the space between the rotors 1 or 2 and the housing member 4 in the direction of the arrow g. The flow of air along the serrated surface 9 will cause a disturbance of the boundary layer there and a flow pattern comprising eddies h along this surface. This will slow the flow of air along the surface 9 considerably. The air flow i along the surface 26 will interrupt the stream of air k flowing along the center of the space. It will do this by gathering speed along the straight portions of surface 26, then, being deflected by the curved portions, will intersect the flow k at an angle. The two flows will then mix and eddy as they flow through the narrower portions of the space. This turbulence will cut down the flow speed considerably. The above process will be repeated again each time the gas flow encounters this restriction, so that the volume of escaping gases will be relatively insignificant. It should be noted that even if only one half of the normal flow is thus restrained, such restriction will be quite sufficient.

If the two surfaces 26 and 9 are sufficiently close together, the surface 26 may be made with the same configuration as the surface 9, if so desired.

Figure 5:
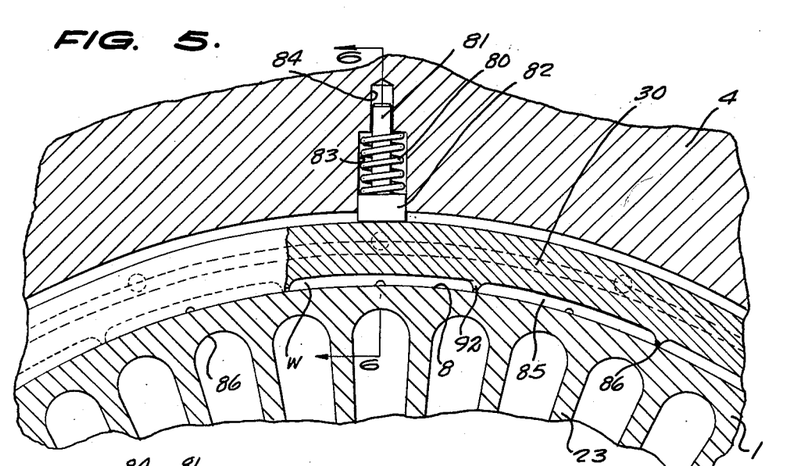
FIGURE 5 is an enlarged fragmentary cross sectional view taken substantially on the line 5—5 of FIGURE 2.

The reason for employing the leakage control seals 30 is that, due to the thermal and elastic expansion of the rotor assembly and the housing, the space w (FIGURES 5 and 6) between the surfaces 8 of the adjacent rotor members and the surfaces of the engine housing opposite thereto cannot be made narrow enough to sufficiently control leakage flowing in the direction of the arrow L shown in FIGURE 6. The function of the control seals 30 is to remain very close to the rotor surface without actually touching it and to do this while the space w between the two bodies becomes smaller or larger. Since the rotor spaces are under pressure only during part of their revolution, this seal extends only far enough to cover this portion (see FIGURE 4). The sealing members 30 are biased inwardly toward the rotors by coiled springs 80 which surround the reduced stems 81 of biasing plungers 82 acting on the arcuate sealing members 30 to urge same inwardly, as shown in FIGURES 5 and 6. The plungers 82 are slidably received in substantially radially extending bores 83 formed in the housing members and the reduced stem portions 81 are slidably received in reduced bore portions 84 in said housing members, as shown in FIGURES 5 and 6. The biasing springs 80 surround the stem portions 81 and bear between the shoulders defined at the ends of the bores 83 and the plunger members 82, which transmit the biasing forces of the springs 80 to the arcuate sealing members 30. The sealing members 30 are formed with the peripheral grooves 85 extending in a circumferential direction and are further formed with the transversely extending notches 86 defining small leakage control spaces between the arcuate sealing member 30 and the adjacent rotor surfaces 8. When the rotors are not turning, the springs 80 urge the plungers 82 inwardly, urging the sealing members 30 into contact with the surfaces 8. When the rotors start to turn, the pressure generated follows the direction of the arrow L. Passages 87 are provided in the housing members placing space w in communication with the top surfaces of members 30. The gases traveling through the passages 87 act on the top surfaces of the sealing members 30. Thus, the pressure of the gases acts to push the sealing members 30 downwardly, as viewed in FIGURE 6, into closer contact with the surfaces 8. However, as shown in FIGURE 6, the surface 88 does not extend the full width of the sealing member 30, the sealing members being shaped so as to provide an additional surface 90 which is exposed to a passage 65 leading to a cooling chamber 11 or 12. Thus, the surface 90 is never under any more pressure than that which exists in the cooling chamber. Therefore, only part of the top surface area of the sealing member 30 is under combustion chamber pressure. By the provision of the groove 85 and notches 86, the whole bottom surface of the sealing member 30 is under combustion chamber pressure. This overbalances the pressure on the top surface 88 and lifts the sealing member 30 clear of the adjacent surface 8. As soon as this occurs, gases start to leak past the sealing members at v in FIGURE 6, which diminishes the pressure on the bottom surface of the sealing member, shown at 92. As soon as this pressure diminishes to the point where it equals the pressure on the surface 88 plus the pressure provided by the springs 80, the sealing member 30 assumes a state of equilibrium and remains at a constant distance from the adjacent rotor surface 8. If the space w should then change, the sealing member 30 will follow in close proximity in order to maintain its state of equilibrium. Thus, the sealing member may be maintained in a very stable position very close to the adjacent rotor surface, which may provide a spacing of the order of one-thousandth of an inch from the revolving rotor surface. This arrangement satisfies the requirement for a frictionless, low leakage seal, as required by the engine. The frictional resistance of the arcuate sealing members 30 in their arcuate seats 94 is sufficient to provide enough damping to prevent seal chatter.

FIGURE 10 illustrates the profile of the special "entrapment" preferred tooth form utilized in accordance with the present invention to define the variable volume working chambers of the engine when the main teeth of the rotors 1 and 2 are engaged. It will be seen that the tooth profile shown in FIGURE 10 differs from the standard involute tooth form employed, for example, for the control gears 17 and 20. The reason that the "entrapment" tooth form of FIGURE 10 differs from the standard involute tooth form is that the "entrapment" teeth must perform a different function from that of merely transmitting power. The involute tooth form employed, for example, for the control gears 17 and 20, transmits power and does this with minimum friction, so that the top of the involute tooth penetrates the outside diameter of its mating gear by a substantial distance before it contacts the mating tooth, and then it rolls, rather than slides, along said mating tooth. This action is ideal for the function performed by the control gears 20 and 17. However, the involute tooth form is quite unsatisfactory for defining the working chambers of the engine where the main function is to trap as much air as possible during the rotation of the rotor members. Thus, the "entrapment" rotor teeth are formed so that one tooth will contact its mating tooth at the earliest possible time during a revolution of the rotor, or expressed differently, the tooth form is that which will provide the greatest possible arc of action for two gears of definite size and proportions.

As shown in FIGURE 10, z designates the apex defined by the intersection of the top land *aa* and the tooth face *ab*. This apex z is, of course, at the outside diameter of the gear. At the moment that the apex z passes inwardly with respect to the periphery defined by the outside diameter of its mating gear, it is closely adjacent to the apex *ac* of said mating gear, thereby enclosing and trapping the maximum possible volume of air in the space between the gear tooth and the recess defined between a pair of successive gear teeth of the mating gear. The faces *ab* and *ad* of the teeth are cut back merely to provide a sliding fit for the apices as they travel through their arcs of action. These arcs of action define the profiles of the gear teeth. It will be noted that as the tooth engagement progresses from the "cut-off point," namely, from the point where the apex z is closely adjacent to the apex *ac*, the opposite apex to the left gear tooth in FIGURE 10 is out of contact with the adjacent surface of the mating gear tooth, whereas the apex *af* of the adjacent mating gear tooth is substantially in sliding contact with the adjacent face of the left gear tooth. This situation continues until one-half of the arc of action is completed, after which the conditions are reversed and the apex *ae* moves into sliding contact with the adjacent face of the right hand gear in FIGURE 10 and the apex *af* is no longer effective in defining the working chamber. It is, of course, undesirable for the main rotor teeth to engage each other with any substantial force, so that, as previously mentioned, a set of control gears 17, 20, with teeth of involute profile are employed to keep the mating surfaces *ab*, *ad*, etc., just clear of each other. Since the thermal and elastic expansions on both rotors 1 and 2 will be almost exactly equal, the main rotor teeth of the rotor members 1 and 2 need not be spaced from each other more than a distance of the order of 1 to 2 thousandths of an inch. While theoretically the apices z, *ae*, etc., are sharp, in practice they are preferably slightly rounded.

Figure 12:
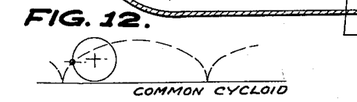
Figure 13:
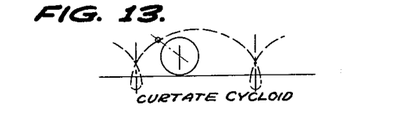
Figure 14:
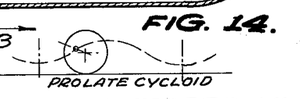

The profile of the working faces *ab*, *ad*, etc., of the "entrapment" gear teeth is generally of cycloid shape. A cycloid is defined as a "curve traced by a point on the radius (prolonged if necessary) of a circle rolling in a plane along a line in the plane." It is called "common" curtate, or "prolate" according to whether the generating point is either on, outside of, or inside the circle. Thus, FIGURE 12 illustrates a cycloid of the "common" type, FIGURE 13 illustrates a cycloid of the "curtate" (or shortened) type and FIGURE 14 illustrates a cycloid of the "prolate" (or lengthened) type.

Figures 3, 15, 16, 17, 20, 21:
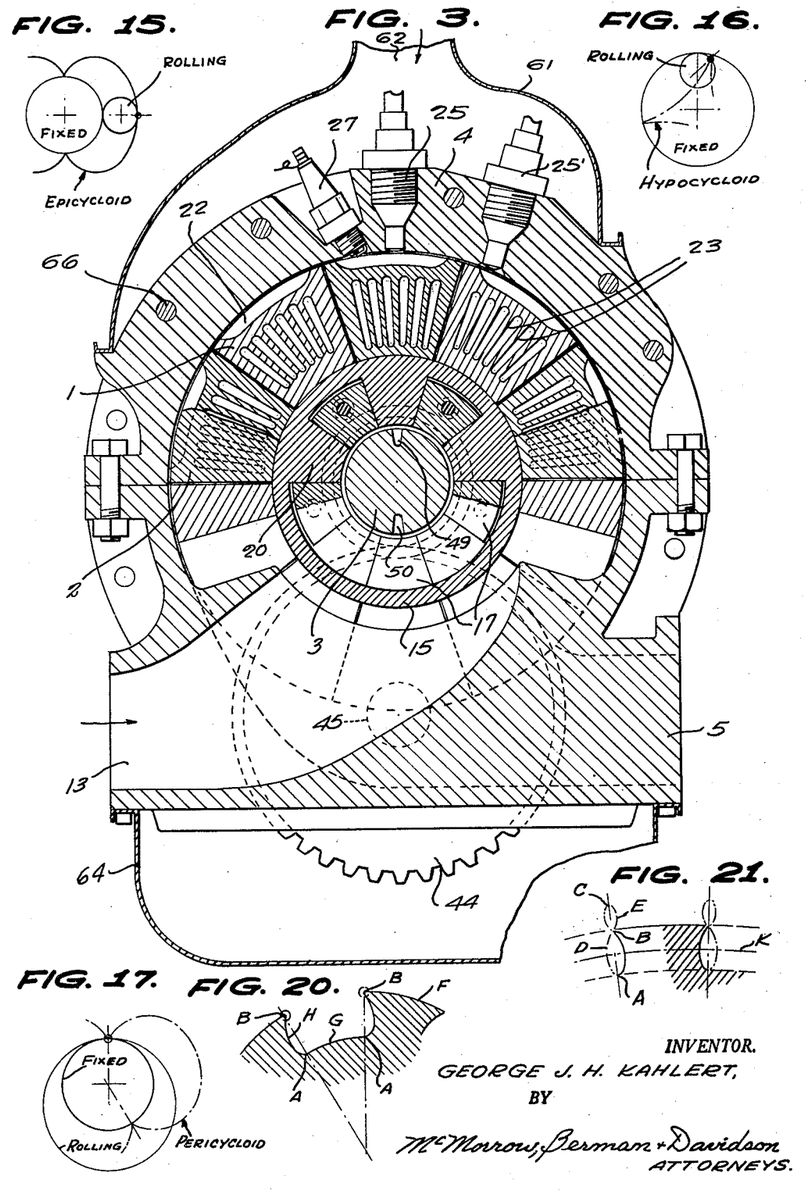
FIGURE 3 is a cross sectional view taken substantially on the line 3—3 of FIGURE 2.
FIGURES 12 to 21 are diagrams illustrating and explaining the configuration of the profiles employed for the working faces of the "entrapment" teeth of the rotor members of the engine.

Cycloids are further divided as to type into "epicycloids," "hypocycloids" and "pericycloids" where: an epicycloid is the line traced by the point of a circle which rolls along the outside of a fixed circle, as illustrated in FIGURE 15; a hypocycloid is the line traced by a point on the outside of a circle which rolls along the inside of a fixed circle, as illustrated in FIGURE 16; and a pericycloid is the line traced by a point on the inside of a circle which rolls along the outside of a fixed circle, as illustrated in FIGURE 17.

From the above it is apparent that the cycloid gearing employed in the engine of the present invention must employ a profile in the general classification of a curtate epicycloid.

It is to be noted that the above discussion deals with the relations between fixed and rolling circles, but in the practical case under present consideration, both circles are revolving about their axes. However, this changes nothing as far as the theoretical relationship of the lines traced in relation to the associated circles are concerned.

Some further considerations are necessary in order to more precisely define the general tooth configuration utilized in a preferred form of the present invention. Thus, when a point of a circle rolls along another circle (in the same plane) of equal size, the resulting line is called a "cardioid," as shown in FIGURE 18. FIGURE 19 illustrates a curtate cardioid wherein A designates the "perigee," B designates the "intersection," C designates the "apogee," D designates the proximal orbit, and E designates the distal orbit. The point of intersection B is the terminal for both orbits D and E. (It is now apparent that any gear with the "entrapment" tooth form employs the full proximal orbit of a curtate epicycloid, but only when both gears are of equal diameters is the curtate cardioid employed to form the tooth profiles.) This gearing satisfies the fundamental requirements of all gearing in that it operates with a constant angular velocity throughout its arcs of rotation. However, because of high friction, this "entrapment" gearing is substantially useless for transmitting power; (this is accomplished by the use of the involute control gears in the present engine).

Further, the proximal orbit is divided along a radial line at the intersection B and the perigee A, as illustrated in FIGURE 20, and the two halves are spaced circumferentially to accommodate the mating tooth, the circumferential distance B—B being exactly equal to the circumferential length of the mating tooth at its outside diameter F (plus or minus a reasonable clearance value). (It is now also apparent that the intersection B must be located at the top of the tooth, namely, at the outside diameter of the gear. The perigee A is located at the bottom of the tooth, so that it logically determines the root diameter of the gear. It is to be further noted that on each gear the point B acts as a generating point of the cycloid on the mating gear.)

In FIGURE 20, the surface F is defined as the "top land," the surface G is defined as the "bottom land," and the surface H is defined as the "tooth face."

Having thus exactly defined the "entrapment" tooth form on any gear where it may be used, the specific type thereof employed in the specific rotary engine of the present invention will now be defined. Referring to FIGURE 19, showing the curtate cardioid, the cycloidal line comprising same is traced onto a two-dimensional plane. However, when dealing with two circles whose axes are not parallel, but angularly displaced, as in the case of two mating beveled gears, the surface onto which the line is traced becomes spherical in nature, with the surface of the sphere normal to both axes. When this angular displacement becomes extreme, for example, of the order of 168 degrees, as in a specific embodiment of the engine of the present invention, the following may be observed:

(1) The distal orbit has become much shorter, in fact shorter than the proximal orbit;

(2) The proximal orbit remains practically unchanged from its original appearance;

(3) The distal orbit has been inverted so that the complete orbit now appears in the form of a figure 8 instead of in its original heart-shape, as illustrated in FIGURE 21. In this figure the rolling, or base, circle K may be used as a pitch circle, but since this line is closer to A than to B, it will be more desirable, for practical purposes, to choose a pitch circle exactly halfway between A and B.

The precise cycloidal form of the "entrapment" tooth profile employed in the preferred embodiment of the engine of the present invention may then be defined as: An inverted cardioid form of a curtate epicycloid in a spherical plane. The gear teeth are formed by the proximal orbit of this curve form.

It should be noted that through the use of the principle of controlled leakage, the avoidance of any eccentric or unbalanced parts, and other features and advantages above explained, the engine of the present invention will have substantially all the advantages of a reciprocating engine and those of a turbine engine, without most of the disadvantages of these conventional types of engines.

As previously mentioned, in the engine of the present invention there are no eccentric parts which would cause a high bearing load, so that substantially the only factors which govern the maximum speed of the engine are bearing life, the tensile strength of the rotor under centrifugal forces, and critical speeds of the engine components. In view of this, it is possible to design an engine according to the present invention having a rotor revolving satisfactorily at a speed of the order of 15,000 revolutions per minute. For example, a typical engine may have a brake horse power rating of 50 with a nine inch rotor diameter, the rotor rotating at a speed of this order. Because of this high speed it is not necessary, and actually undesirable, because of high friction, to perfectly seal the combustion chambers. More satisfactory operation is obtained by merely controlling the gas leakage so as to hold same to a small amount. This is done very successfully in the engine of the present invention. In the typical engine above described with the rotor rotating at ten thousand revolutions per minute, the engine leakage would be between 2 and 5 percent, with a ten-to-one compression ratio. Assuming a minimum of four-to-one compression before starting, this would mean a starting speed of 300 to 800 revolutions per minute. Since a gear reduction of about three-to-one is a necessary part of this engine, this reduces the cranking speed to between one hundred and about two hundred and seventy revolutions per minute, which is within easy range of any conventional automotive starter. Air cooling is the logical means for cooling the engine, and this air cooling is easily furnished by the cooling vanes 23 of the rotor members. Thus, there is no need for an extra cooling blower, or the like. The provision of the fins 32 adjacent the combustion chambers makes it possible to cool the entire engine internally without requiring any external cooling.

While a specific embodiment of an improved rotary internal combustion engine has been disclosed in the foregoing description, it is to be understood that various modifications within the spirit of the invention may occur to those skilled in the art. Therefore, it is intended that no limitations be placed on the invention except as defined by the scope of the appended claims.

What is claimed is:

1. In a rotary engine, a pair of rotors rotatably mounted on axes disposed at an angle to each other, main tooth members on said rotors, said main tooth members being formed with interengaging faces in the form of curtate epicycloids, said faces engaging each other at times with substantially sliding contact to define substantially gas-tight chambers between the main tooth members, means to admit combustible fuel into said chambers, means to ignite such fuel, and meshing gear means on said rotors inwardly of said main tooth members, said gear means being constructed and arranged to prevent relative rotation of the rotors.

2. In a rotary engine, a pair of rotors rotatably mounted on axes disposed at an angle to each other, main tooth members on said rotors, said main tooth members being formed with inter-engaging faces each of which is contoured as an inverted cardioid form of a curtate epicycloid in a spherical plane, said faces engaging each other at times with substantially sliding contact to define substantially gas-tight chambers therebetween, means to admit combustible fuel into said chambers, means to ignite said fuel, and additional meshing gear means on said rotors constructed and arranged to prevent relative rotation of the rotors.

3. In a rotary engine, a pair of rotors rotatably mounted on axes disposed at an angle to each other, main tooth members on said rotors, said main tooth members being formed with inter-engaging faces in the form of curtate epicycloids engaging each other at times with substantially sliding contact to define substantially gas-tight chambers between the tooth members, means to admit combustible fuel into said chambers, means to ignite such fuel, and additional meshing involute gears on said rotors constructed and arranged to prevent relative rotation of the rotors.

4. In a rotary engine, a pair of rotors rotatably mounted on axes disposed at an angle to each other, main tooth members on said rotors interengaging to at times define substantially gas-tight chambers, means to admit combustible fuel into said chambers, means to ignite such fuel, meshing gear means on said rotors constructed and arranged to prevent relative rotation of the rotors, a spherical housing member carried by one of the rotors and surrounding said meshing gear means, said housing member extending into the other rotor, and sealing means on said other rotor sealingly engaging said housing member.

5. In a rotary engine, a pair of rotors rotatably mounted on axes disposed at an angle to each other, main tooth members on said rotors, said main tooth members being formed with interengaging faces of generally cycloidal contour engaging each other at times with substantially sliding contact to define substantially gas-tight chambers between the main tooth members, means to admit combustible fuel into said chambers, means to ignite such fuel, meshing gear means on said rotors constructed and arranged to prevent relative rotation of the rotors, a spherical housing member carried by one of the rotors and surrounding said meshing gear means, said housing member extending into the other rotor, and sealing means on said other rotor sealingly engaging said housing member.

6. In a rotary engine, a pair of rotors rotatably mounted on axes disposed at an angle to each other, main tooth members on said rotors interengaging at times to define substantially gas-tight chambers, a housing surrounding said rotors, movable sealing means on the housing extending closely adjacent the peripheral portions of said rotors on opposite sides of said chambers, pressure-responsive means controlling the positions of the sealing means relative to said peripheral portions in accordance with the fluid pressure in said chambers, means to admit combustible fuel into said chambers, means to ignite said fuel, and meshing gear means on said rotors constructed and arranged to prevent relative rotation of said rotors.

7. In a rotary engine, a pair of rotors rotatably mounted on axes disposed at an angle to each other, main tooth members on said rotors interengaging at times to define substantially gas-tight chambers, a housing surrounding said rotors, movable sealing means on the housing extending closely adjacent the peripheral portions of said rotors on opposite sides of said chambers, means biasing said sealing means into engagement with the peripheral portions of the rotors, means to separate said sealing means from the peripheral portions of the rotors by a predetermined, substantially constant, relatively small spacing responsive to combustion pressure in the chambers, means to admit combustible fuel into said chambers, means to ignite said fuel, and meshing gear means on said rotors constructed and arranged to prevent relative rotation of said rotors.

8. In a rotary engine, a pair of rotors rotatably mounted on axes disposed at an angle to each other, main tooth members on said rotors, said main tooth members being formed with interengaging faces of generally cycloidal contour engaging each other at times with substantially sliding contact to define substantially gas-tight chambers between the tooth members, a housing surrounding said rotors, movable sealing means on the housing extending closely adjacent the peripheral portions of said rotors on opposite sides of said chambers, means biasing said sealing means into engagement with the peripheral portions of the rotors, means to separate said sealing means from the peripheral portions of the rotors by a predetermined, substantially constant, relatively small spacing responsive to combustion pressure in the chambers, means to admit combustible fuel into said chambers, means to ignite such fuel, and meshing involute gears on said rotors constructed and arranged to prevent relative rotation of said rotors.

9. In a rotary engine, a pair of rotors rotatably mounted on axes disposed at an angle to each other, main tooth members on said rotors interengaging at times to define substantially gas-tight chambers, a housing surrounding said rotors and having inside wall surfaces extending closely adjacent the peripheral surfaces of the rotors, said wall surfaces and peripheral surfaces being roughened and being sufficiently close to each other to produce eddies and substantial turbulence in gases flowing therebetween, whereby to substantially restrict leakage flow of such gases, means to admit combustible fuel into said chambers, means to ignite said fuel, and meshing gear means on said rotors constructed and arranged to prevent relative rotation of said rotors.

10. In a rotary engine, a pair of rotors rotatably mounted on axes disposed at an angle to each other, main tooth members on said rotors, said main tooth members being formed with interengaging faces of generally cycloidal contour engaging each other at times with substantially sliding contact to define substantially gas-tight chambers between the tooth members, a housing surrounding said rotors and having inside wall surfaces extending closely adjacent the peripheral surfaces of the rotors, said wall surfaces and peripheral surfaces being roughened and being sufficiently close to each other to produce eddies and substantial turbulence in gases flowing therebetween, whereby to substantially restrict leakage flow of such gases, means to admit combustible fuel into said chambers, means to ignite such fuel and meshing involute gears on said rotors constructed and arranged to prevent relative rotation of said rotors.

11. In a rotary engine, a pair of rotors rotatably mounted on axes disposed at an angle to each other, main tooth members on the outer portions of said rotors slidably interengaging at times to define substantially gas-tight chambers, meshing gear means on the inner portions of said rotors constructed and arranged to prevent relative rotation of said rotors, a spherical housing member carried by one of the rotors and surrounding said meshing gear means, said housing member extending into the other rotor, and a pair of annular sealing rings carried by the other rotor, one of said annular sealing rings sealingly engaging the housing member, and wedging surfaces on the other ring engaging said other rotor and said one sealing ring to exert inward sealing force on said one sealing ring responsive to centrifugal force exerted on said other ring.

12. In a rotary engine, a pair of rotors rotatably mounted on axes disposed at an angle to each other, main tooth members on the outer portions of said rotors slidably interengaging at times to define substantially gas-tight chambers, meshing gear means on the inner portions of said rotors constructed and arranged to prevent relative rotation of said rotors, a spherical housing member carried by one of the rotors and surrounding said meshing gear means, said housing member extending into the other rotor, a pair of annular sealing rings carried by the other rotor, one of said annular sealing rings sealingly engaging the housing member, wedging surfaces on the other ring engaging said other rotor and said one sealing ring to exert inward sealing force on said one sealing ring responsive to centrifugal force acting on said other ring, a main housing surrounding said rotors and having inside wall surfaces extending closely adjacent the peripheral surfaces of the rotors, said wall surfaces and peripheral surfaces being roughened and being sufficiently close to each other to produce eddies of substantial turbulence in gases flowing therebetween, whereby to substantially restrict leakage flow of such gases, means to admit combustible fuel into said chambers, and means to ignite such fuel.

13. In a rotary engine, a pair of rotors rotatably mounted on axes disposed at an angle to each other, main tooth members on the outer portions of said rotors, said main tooth members being formed with interengaging faces, each of which is contoured in the form of a curtate epicycloid, said faces engaging each other at times with substantially sliding contact to define substantially gas-tight chambers between the main tooth members, meshing involute gears on the inner portions of said rotors constructed and arranged to prevent relative rotation of said rotors, a spherical housing member carried by one of the rotors and surrounding said meshing involute gears, said housing member extending into the other rotor, a pair of annular sealing rings carried by the other rotor, one of said annular sealing rings sealingly engaging the housing member, wedging surfaces on the other ring engaging said other rotor and said one sealing ring to exert inward sealing force on said one sealing ring responsive to centrifugal force acting on said other ring, a main housing surrounding said rotors and having inside wall surfaces extending closely adjacent the peripheral surfaces of the rotors, said wall surfaces and peripheral surfaces being roughened and being sufficiently close to each other to produce eddies and substantial turbulence in gases flowing therebetween whereby to substantially restrict leakage flow of such gases, means to admit combustible fuel into said chambers, and means to ignite such fuel.

14. In a rotary engine, a pair of rotors rotatably mounted on axes disposed at an angle to each other, main tooth members on the outer portions of the rotors slidably interengaging at times to define substantially gas-tight chambers, meshing gear means on the inner portions of said rotors constructed and arranged to prevent relative rotation of said rotors, cooperating means on the rotors sealingly housing said meshing gear means, a main housing surrounding said rotors, said rotors being formed with cooling air passages extending from the sides thereof opposite the main tooth members to the peripheries of the rotors, cooling air intake means on the main housing communicating with the surfaces of the rotors opposite the main tooth members, further air intake means in the main housing communicating with the space between the rotors and being adapted to supply air for entrapment in said chambers, means to admit combustible fuel into said chambers, means to ignite such fuel, and exhaust conduit means in the main housing communicating with the peripheral portions of the rotors at a location substantially opposite the gas-tight chambers.

15. In a rotary engine, a pair of rotors rotatably mounted on axes disposed at an angle to each other, main tooth members on the outer portions of the rotors, said main tooth members being formed with interengaging faces of generally cycloidal contour engaging each other at times with substantially sliding contact to define substantially gas-tight chambers therebetween, meshing gear means on the inner portions of said rotors constructed and arranged to prevent relative rotation of said rotors, cooperating means on the rotors sealingly housing said meshing gear means, a main housing surrounding said rotors, said rotors being formed with cooling air passages extending from the sides thereof opposite the main tooth members to the peripheries thereof, cooling air intake means on the main housing communicating with the sides of the rotors opposite said main tooth members, further air intake means in the main housing communicating with the space between the rotors and being adapted to supply air for entrapment in said chambers, means to admit combustible fuel into said chambers, means to ignite such fuel, and exhaust conduit means in the main housing communicating with the peripheral portions of the rotors at a location substantially opposite the gas-tight chambers.

16. In a rotary engine, a pair of rotors rotatably mounted on axes disposed at an angle to each other, main tooth members on the outer portions of the rotors, said main tooth members being formed with interengaging faces each of which is contoured as an inverted cardioid form of a curtate epicycloid in a spherical plane, said faces engaging each other at times with substantially sliding contact to define substantially gas-tight chambers therebetween, involute gears on the inner portions of said rotors meshing with each other and constructed and arranged to prevent relative rotation of said rotors, cooperating means on the rotors sealingly housing said involute gears, a main housing surrounding said rotors, said rotors being formed with cooling air passages extending from the sides thereof opposite the main tooth members to the peripheries thereof, cooling air intake means on the main housing communicating with the sides of the rotors opposite their main tooth members, further air intake means in the main housing communicating with the space between the rotors and being adapted to supply air for entrapment in said chambers, means to admit combustible fuel into said chambers, means to ignite such fuel, and exhaust conduit means in the main housing communicating with the peripheral portions of the rotors at a location substantially opposite the gas-tight chambers.

References Cited in the file of this patent

UNITED STATES PATENTS

| 32,372 | Jones et al. | May 21, 1861 |
| 2,674,952 | Jacobsen | Apr. 13, 1954 |
| 2,674,982 | McCall | Apr. 13, 1954 |

FOREIGN PATENTS

| 268,459 | Italy | Oct. 17, 1929 |